United States Patent Office 2,744,912
Patented May 8, 1956

2,744,912

4-O.O-DIPHENYLPHOSPHONYLAMINO-ANTI-PYRIN AND PROCESS FOR ITS PRODUCTION

Paul Gailliot, Paris, and Francois Debarre, Eaubonne, France, assignors to Societe des Usines Chimiques Rhone-Poulenc, Paris, France, a French body corporate No Drawing. Application October 13, 1955,
Serial No. 540,340

Claims priority, application France October 26, 1954

7 Claims. (Cl. 260—310)

This invention has for its object to provide a new derivative of 4-aminoantipyrin having unexpectedly useful therapeutic properties.

The new compound of the present invention is 4-O.O-diphenylphosphonylamino-antipyrin of the formula:

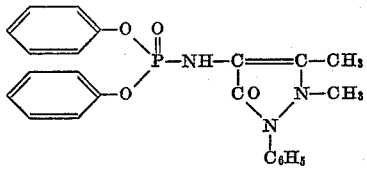

which, according to a feature of this invention, is prepared by condensing a diphenyl halogenophosphate of the formula:

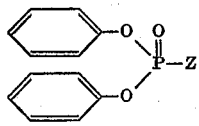

(wherein Z represents a halogen atom) with 4-aminoantipyrin of the formula:

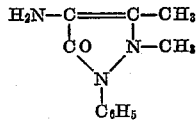

The condensation may be carried out at room temperature in solution in an inert anhydrous solvent such as a hydrocarbon or a chlorinated solvent by simple contact of the reactants. Advantageously the condensation is carried out in the presence of an amine hydrogen halide sequestering agent, for example a lower aliphatic amine such as triethylamine or methyldiethylamine. It is sometimes useful to apply heat in order to speed up the reaction.

The product of the present invention possesses interesting pharmaco-dynamic properties; in particular it has efficacy as an analgesic and as an anti-inflammatory agent and is, therefore, useful in human and veterinary medicine.

The following example is given in order to illustrate the invention:

Example

Triethylamine (40.4 g.) dissolved in benzene (125 cc.) is added to an agitated solution of 4-aminoantipyrin (81.2 g.) in benzene (975 cc.) and a solution of diphenyl chlorophosphate (107.4 g.) in benzene (200 cc.) is then added over 20 minutes. After agitation for 5 hours, the mixture is left for 15 hours and the precipitate formed is then filtered off, washed with benzene (200 cc.) and dried in vacuo. The crude product obtained is washed with water (1,000 cc.) and dried in vacuo. 4-O.O-diphenylphosphonylaminoantipyrin (77 g.) is thus obtained which, after recrystallisation from ethyl acetate (2,300 cc.), melts at 176° C.

An identical product may be obtained by repeating the example with the diphenyl chlorophosphate replaced by an equivalent quantity of diphenyl bromophosphate.

We claim:

1. 4-O.O-diphenylphosphonylamino-antipyrin of the formula:

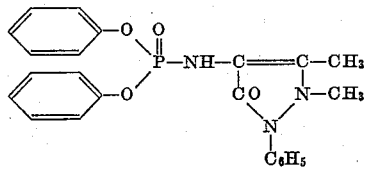

2. A method of preparing 4-O.O-diphenylphosphonyl-amino-antipyrin which comprises condensing, under anhydrous conditions, a diphenyl halogenophosphate of the general formula:

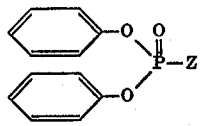

wherein Z represents a halogen atom with 4-aminoantipyrin of the formula:

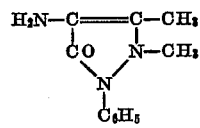

3. A method according to claim 2 in which the condensation is carried out in the presence of an amine as a hydrogen halide sequestering agent.

4. A method according to claim 2 in which the condensation is carried out in the presence of triethylamine as a hydrogen halide sequestering agent.

5. A method according to claim 2 in which the condensation is carried out in solution in a hydrocarbon solvent.

6. A method of preparing 4-O.O-diphenylphosphonyl-amino-antipyrin which comprises admixing 4-aminoantipyrin and diphenyl chlorophosphate in the presence of triethylamine and an inert organic solvent, allowing a condensation reaction to take place in the mixture and separating the 4-O.O-diphenylphosphonylamino-antipyrin thus formed.

7. A method according to claim 6 in which the inert solvent is benzene.

No references cited.